(12) United States Patent
Nishizaka

(10) Patent No.: US 9,065,940 B2
(45) Date of Patent: Jun. 23, 2015

(54) PRINT APPARATUS INCLUDING IMAGE READ APPARATUS-SIDE COMMUNICATING SECTION

(71) Applicant: SEIKO EPSON CORPORATION, Tokyo (JP)

(72) Inventor: Katsuhiko Nishizaka, Fukuoka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/224,421

(22) Filed: Mar. 25, 2014

(65) Prior Publication Data

US 2014/0293310 A1      Oct. 2, 2014

(30) Foreign Application Priority Data

Mar. 28, 2013   (JP) ................. 2013-068282

(51) Int. Cl.
*H04N 1/00* (2006.01)
*G06F 3/12* (2006.01)

(52) U.S. Cl.
CPC ....... *H04N 1/00278* (2013.01); *H04N 1/00241* (2013.01); *H04N 2201/0013* (2013.01); *H04N 2201/0081* (2013.01); *G06F 3/1204* (2013.01); *G06F 3/126* (2013.01); *G06F 3/1284* (2013.01); *G06F 3/1291* (2013.01)

(58) Field of Classification Search
USPC ................................. 358/1.13–1.15
See application file for complete search history.

(56) References Cited

U.S. PATENT DOCUMENTS

| | | | |
|---|---|---|---|
| 2005/0237559 A1 | 10/2005 | Watanabe | |
| 2012/0127502 A1* | 5/2012 | Kim et al. | .......... 358/1.13 |
| 2012/0268798 A1* | 10/2012 | Kohara | ............ 358/444 |

FOREIGN PATENT DOCUMENTS

JP   2005-311955 A   11/2005

* cited by examiner

*Primary Examiner* — Qian Yang
(74) *Attorney, Agent, or Firm* — Global IP Counselors, LLP

(57) ABSTRACT

When a start button of a scanner is operated in a state where a communication connection has been established with the scanner, then image data generated by the scanner by reading a document is acquired, a run mode is set from a plurality of operating modes including a copy mode and a transfer mode, and a process corresponding to the set run mode is executed on the acquired image data. This makes it possible to realize a plurality of functions of a printer in response to a single start button of a scanner.

4 Claims, 4 Drawing Sheets

PRINT APPARATUS INCLUDING IMAGE READ APPARATUS-SIDE COMMUNICATING SECTION

CROSS-REFERENCE TO RELATED APPLICATIONS

This application claims priority to Japanese Patent Application No. 2013-068282 filed on Mar. 28, 2013. The entire disclosure of Japanese Patent Application No. 2013-068282 is hereby incorporated herein by reference.

BACKGROUND

1. Technical Field

The present invention relates to a print apparatus configured to connect to and disconnect from an image read apparatus that is configured to read an image based on an operation of an operation unit.

2. Related Art

One conventionally proposed print apparatus of this type is connected directly to a scanner via a transmission cable such as an IEEE1394-conforming cable or a universal serial bus (USB) cable (see JP-A-2005-311955 (patent document 1), for example). With such an apparatus, image data is inputted from the scanner and the inputted image data is processed to make a print output.

SUMMARY

Thus, with the print apparatus described above, connecting the scanner makes it possible to execute not only a simple print function, but also multi-functions such as a copy function. However, for example, with portable scanners and the like, often only a small number of buttons are implemented on an operation panel, and without alteration it has been difficult to execute a variety of functions by operating the operation panel of the scanner.

An advantage of some aspects of the print apparatus of the present invention is to realize the execution of a plurality of functions in reaction to an operation of an operation unit belonging to an image read apparatus in a case where the image read apparatus has been connected.

A print apparatus according to an aspect of the invention employs the following configuration in order to achieve the advantage described above.

The print apparatus according to the aspect of the invention is configured to connect with and disconnect a connection with an image read apparatus that is configured to read an image based on an operation of an operation unit. The print apparatus includes: an image read apparatus-side communicating section configured to communicate with the image read apparatus in a state where the image read apparatus is connected; a run mode acquiring section configured to acquire one of a plurality of run modes including a copy mode; and a process executing section configured to execute a copy process for generating print data based on image data and executing printing based on the generated print data in a case where the image data that is read by the image read apparatus based on the operation of the operation unit in a state where the copy mode has been acquired as the run mode is received via the image read apparatus-side communicating section, and configured to execute a process corresponding to the run mode based on the image data in a case where the image data that is read by the image read apparatus based on the operation of the operation unit in a state where a mode other than the copy mode has been acquired as the run mode is received via the image read apparatus-side communicating section.

This print apparatus according to the aspect of the present invention is configured to connect with and disconnect the connection with the image read apparatus that is configured to read the image based on the operation of an operation unit. The print apparatus is configured to acquire one of the plurality of run modes including the copy mode. The print data is generated based on the image data and the copy process for executing printing based on the generated print data is executed in a case where the image data that is read by the image read apparatus based on the operation of the operation unit in a state where the copy mode has been acquired as the run mode is received via the image read apparatus-side communicating section. The process corresponding to the acquired run mode based on the image data is executed in a case where the image data that is read by the image read apparatus based on the operation of the operation unit in a state where a mode other than the copy mode has been acquired as the run mode is received via the image read apparatus-side communicating section. This makes it possible to realize the execution of a plurality of functions including a copy function in response to an operation of the operation unit belonging to the image read apparatus, and to improve the convenience for the user.

In the print apparatus according to the aspect of the invention of such description, the print apparatus further includes a host machine-side communicating section configured to communicate with a host machine. The run mode acquiring section is further configured to acquire one of the plurality of run modes including the copy mode and a transfer mode, and the process executing section is further configured to execute a transfer process for transferring the image data to the host machine via the host machine-side communicating section in a case where the image data that is read by the image read apparatus based on the operation of the operation unit in a state where the transfer mode has been acquired as the run mode is received via the image read apparatus-side communicating section. So doing makes it possible to realize the copy function and the transfer function in response to an operation of the operation unit of the image read apparatus.

In the print apparatus according to the aspect of the invention, the print apparatus has the transfer mode as the run mode. The transfer mode includes a mode for transferring the image data to the host machine and instructing that the image data be saved to a storage device provided to the host machine.

In the print apparatus according to the aspect of the invention, the print apparatus has the transfer mode as the run mode. The transfer mode includes a mode for transferring the image data to the host machine and instructing that the image data be saved to a storage device connected to the host machine via a network.

Furthermore, in the print apparatus according to the aspect of the invention, the print apparatus further includes a host machine-side communicating section configured to communicate with a host machine, and a setting information acquiring section configured to acquire setting information via the host machine-side communicating section from the host machine. The run mode acquiring section is further configured to acquire one of the plurality of run modes based on the acquired setting information. So doing makes it possible for the user of the host machine to select the desired mode from among the plurality of run modes.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
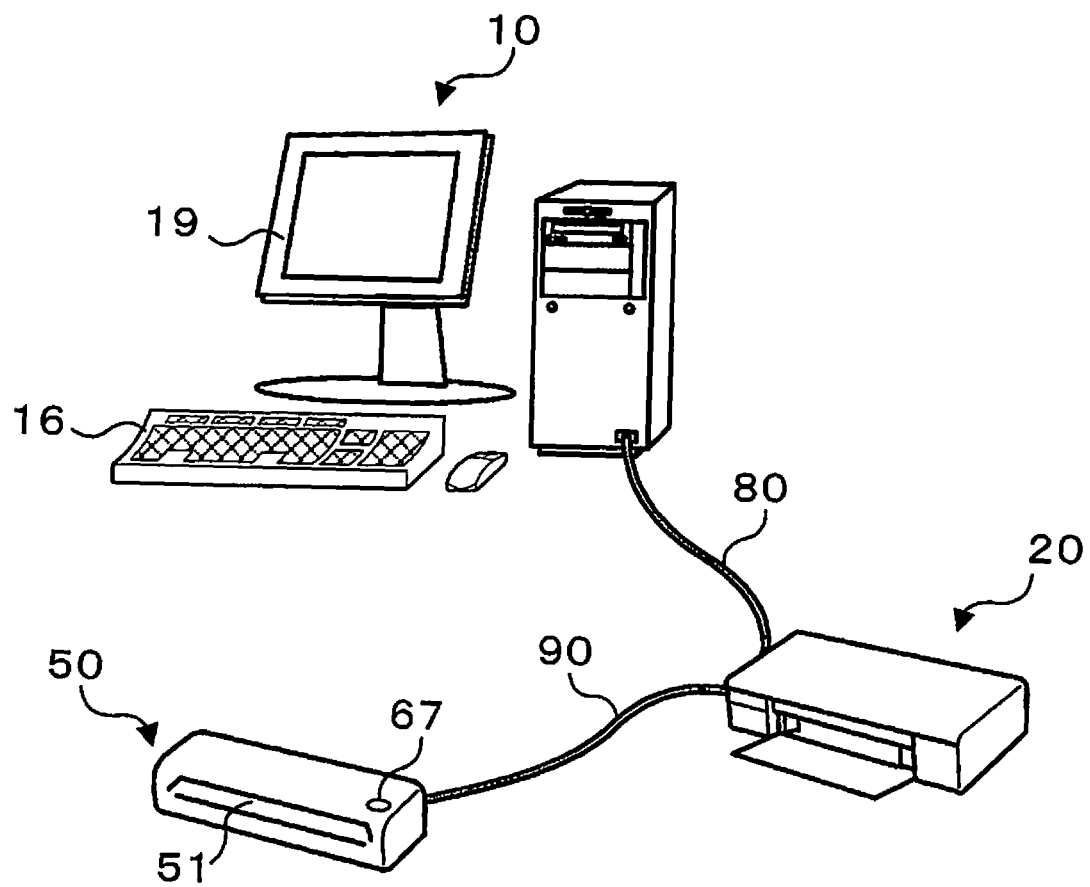
FIG. 1 is a schematic diagram of a print system of the present embodiment.

An embodiment according to an aspect of the invention shall be described next, with reference to the accompanying drawings. FIG. 1 is a configurational view illustrating a schematic of the configuration of a print system, and FIG. 2 is a block diagram illustrating functional blocks of a computer 10 and printer 20 constituting a print system, as well as a scanner 50.

The print system of the present embodiment is configured as a system with which a computer 10 and a printer 20 can be connected by a USB cable 80, and the printer 20 and a scanner 50 can be connected by a USB cable 90. In the present embodiment, the printer 20 is configured as a portable printer with which driving is carried out by receiving the supply of power coming from an AC adapter (not shown), and driving can also be performed by receiving the supply of power from a battery (not shown). The scanner 50, too, is configured as a scanner with which driving is carried out by receiving the supply of power coming from an AC adapter (not shown), and driving can also be performed by receiving the supply of power from a battery (not shown).

Figure 2:
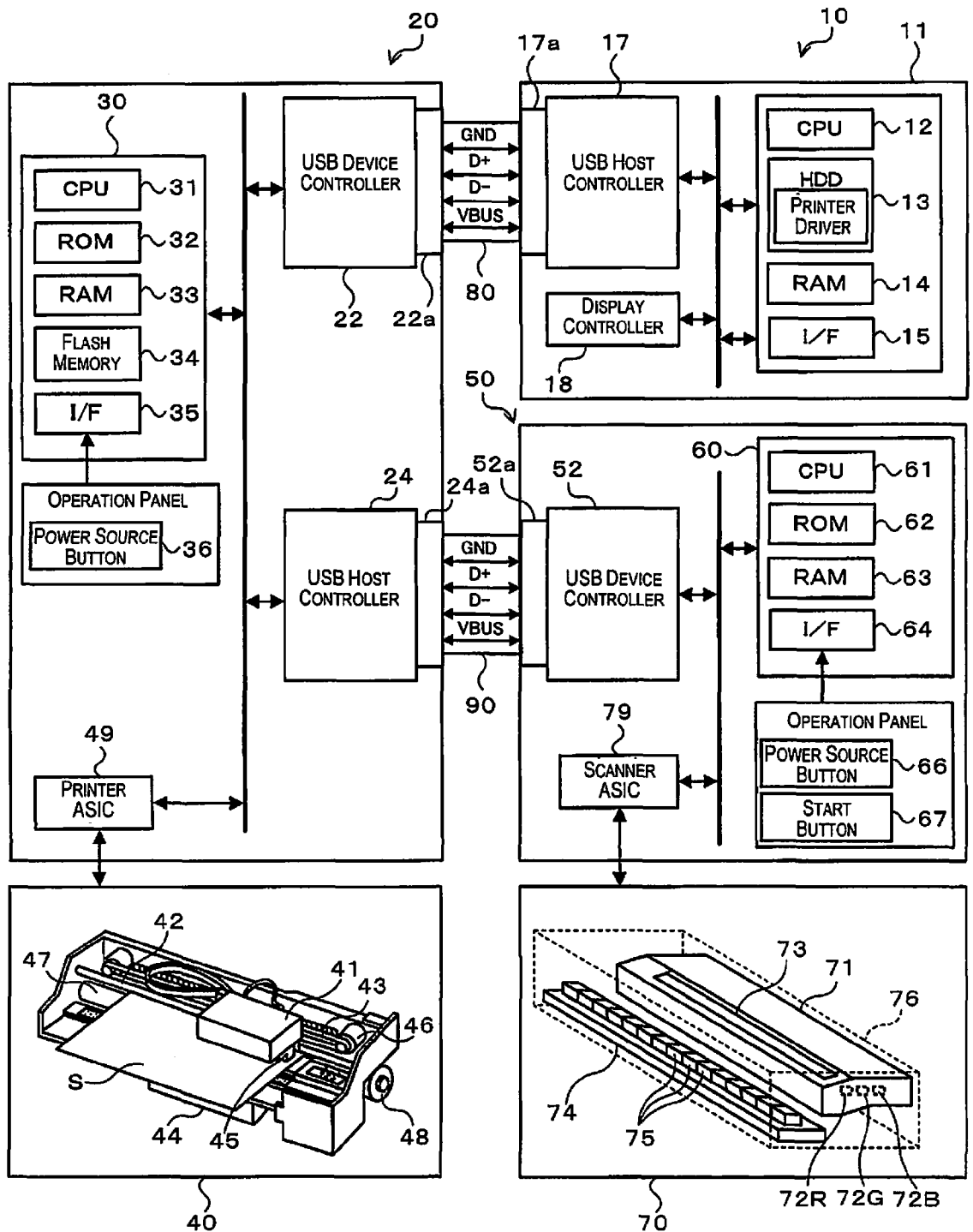
FIG. 2 is a functional block diagram of a computer 10, a printer 20, and a scanner 50.

The computer 10, as illustrated in FIGS. 1 and 2, is configured as a general-purpose computer provided with: a computer main body 11 incorporating a CPU 12 serving as a central computation processing apparatus, a hard disk drive (HDD) 13 storing a variety of applications, user files, printer drivers, and the like, a RAM 14 for temporarily storing data, and the like; a keyboard (and mouse) 16 serving as an input apparatus; and a display 19 serving as a display apparatus. In addition to the CPU 12, the HDD 13, and the RAM 14, the computer main body 11 is provided with: an interface (I/F) 15 for inputting characters from the keyboard 16; a USB host controller 17 complying with the USB 2.0 standard for communicating with a peripheral machine (which, in the present embodiment, is the printer 20) via the USB cable 80, which is connected to a USB port 17a; and a display controller 18 for controlling the display of the display 19; these elements are electrically connected together via a bus.

The printer 20 of the present embodiment is configured as an inkjet printer with a built-in printer engine 40. The printer engine 40, as illustrated in FIG. 2, is provided with: a carriage 41 that is driven by a carriage belt 43 stretched in the shape of a loop in the left/right direction (a main scanning direction) and moves reciprocatingly left and right along a guide 42; ink cartridges 44 for supplying inks of different colors such as cyan, magenta, yellow, and black; a print head 45 for applying pressure to each of the inks supplied from each of the ink cartridges 44 by applying a voltage to and deforming piezoelectric elements, to discharge the inks toward a paper S from nozzles; a carriage motor 46 for driving the carriage belt 43 and reciprocatingly moving the carriage 41 in the main scanning direction; a paper feed roller 47 for conveying the paper S in a direction (a second scanning direction) orthogonal to the direction of movement of the carriage 41; and a paper feed motor 48 for rotatably driving the paper feed roller 47. The present embodiment, however, employs an off-carriage type with which the ink cartridges 44 are not loaded onto the carriage 41, but an on-carriage type with which the ink cartridges are loaded onto the carriage 41 may also be employed.

As a control system therefor, the printer 20 of the present embodiment, as illustrated in FIG. 2, is provided with a main controller 30 for governing over the control of the printer overall, a printer ASIC 49 for governing control over the printer engine 40, a USB device controller 22 for communicating as a device machine to the computer 10, and a USB host controller 24 for communicating as a host machine to the scanner 50. With the printer 20 in the present embodiment, the main controller 30, the printer ASIC 49, the USB device controller 22, and the USB host controller 24 are configured as a system on a chip integrated onto a single chip.

The main controller 30 is configured as a microprocessor for which the center is a CPU 31, and is provided with: a ROM 32 for storing a variety of processing programs, a variety of data, a variety of tables, and the like; a RAM 33 for temporarily storing data; a flash memory 34 which can be written over, and with which data is retained even when the power source is cut; and an interface (I/F) 35 for inputting an operation signal coming from a power source button 36. The main controller 30: receives via the printer ASIC 49, the input of a detection signal coming from a variety of sensors (for example, a carriage position sensor for detecting the position of the carriage 41, a rotational angle sensor for detecting the angle of rotation of the paper feed motor 48, and the like) for detecting the state of driving of the printer engine 40; receives via the USB device controller 22, the input of received data coming from the computer 10; and receives via the USB host controller 24, the input of received data coming from the scanner 50. The main controller 30: outputs, to the USB device controller 22, transmitted data to be transmitted to the computer 10 side; outputs, to the USB host controller 24, transmitted data to be transmitted to the scanner 50 side; and outputs, to the printer ASIC 49, a drive command for the printer engine 40.

The USB device controller 22 and the USB host controller 24, in the present embodiment, are configured as USB controllers compliant with the USB 2.0 standard, and exchange communication data via the USB cables 80, 90, respectively. Herein, the USB cables 80, 90 have a power source system line formed of a VBUS line and a ground (GND) line, and a signal system line formed of a D+ line and a D− line. A standard A plug connected to the USB port 17a on the computer 10 side is provided to one end of the USB cable 80, and a standard B plug connected to the USB port 22a on the printer 20 side is provided to the other end of the USB cable 80. Additionally, a standard A plug connected to the USB port 24a on the printer 20 side is provided to one end of the USB cable 90, and a standard B plug connected to the USB port 52a on the scanner 50 side is provided to the other end of the USB cable 90.

The scanner 50 of the present embodiment is configured as an image scanner of the contact image sensor (CIS) type, with a built-in scanner engine 70. The scanner engine 70, as illustrated in FIG. 2, is provided with a light source unit 71 for irradiating a document with light, a CIS 74 for reading the document by receiving reflected light coming from the document and storing the reflected light as an electrical charge, and an automatic paper feeding apparatus (not shown) for feeding documents inserted to an insertion port 51. The light source unit 71 has light sources that vary relatively little in the amount of light (more specifically, three colors of light sources: a red LED 72R for shining a red light, a green LED 72G for shining a green light, and a blue LED 72B for shining a blue light), and irradiates the document with light coming from the light sources via a light guide 72. The CIS 74 is configured such that there is one line of a plurality of light-receiving elements (CMOS image sensors) 75 arrayed in the main scanning direction, and generates color image data by reading the reflected light one color at a time while sequentially switching between shining the LEDs 72R, 72G, 72B of each of the colors.

The scanner 50 is also provided, as the control system thereof, with a main controller 60 for governing control of the scanner overall, a scanner ASIC 79 for governing control of the scanner engine 70, and a USB device controller 52 for communicating with the printer 20 as a device machine. The scanner ASIC 79, though not depicted, is provided with: an LED drive circuit for driving each of the LEDs 72R, 72G, 72B; an A/D converter for converting an amplified and inputted analog signal produced by the CIS 74 into a digital signal; a drive circuit for driving the automatic paper feed apparatus; and the like; when a scan command coming from the main controller 60 is received in a state where a document has been inserted into the insertion port 51, then the scanner engine 70 is controlled so that the document is read as image data while also being fed.

The main controller 60 is configured as a microprocessor for which a CPU 61 is the center, and is provided with: a ROM 62 for storing a variety of processing programs, a variety of data, a variety of tables, and the like; a RAM 63 for temporarily storing data; and an interface (I/F) 64 for inputting an operation signal coming from a power source button 66 and an operation signal coming from a start button 67. The main controller 60 receives via the scanner ASIC 79 the inputting of a detection signal coming from a variety of sensors for detecting the state of driving of the scanner engine 70, and receives via the USB device controller 52 the inputting of received data coming from the printer 20. The main controller 60 outputs to the USB device controller 52 transmitted data to be transmitted to the printer 20 side, and outputs to the scanner ASIC 79 a drive command for the scanner engine 70.

In the present embodiment, as described above, the scanner 50 is configured as a portable scanner, and in terms of the operation system thereof, is not provided with any operation buttons or operation switches other than the power source button 66 and the start button 67.

The operation of establishing a communication connection between the printer 20 and the scanner 50 shall now be described. When either the power is turned on in a state where the printer 20 and the scanner 50 have been connected by the USB cable 90 or the printer 20 and the scanner 50 are connected by the USB cable 90 in a state where the power has been turned on, a USB communication connection is established, and the USB host controller 24 of the printer 20 acquires a device descriptor that describes the configuration as a USB device from the USB device controller 52 of the scanner 50. This device descriptor includes the fact that the scanner 50 is a device of an image class, and this makes it possible for the printer 20 to recognize that the scanner 50 is a device of the image class. When the communication connection is established and communication with the scanner 50 becomes possible, the printer 20 is able to acquire the image data that is obtained by the scanner 50 by reading the document, and it becomes possible to execute a variety of processes based on the acquired image data. That is to say, the printer 20 of the present embodiment operates as a single-function printer when the communication connection with the scanner 50 is not established, and becomes able to operate as a multi-function printer through collaboration with the scanner 50 when the communication connection with the scanner 50 is established.

Next, the operation of when the communication connection is established between the printer 20 and the computer 10 shall be described. When either the power is turned on in a state where the printer 20 and the computer 10 have been connected by the USB cable 80 or the printer 20 and the computer 10 are connected by the USB cable 80 in a state where the power has been turned on, a USB communication connection is established, and the USB host controller 17 of the computer 10 acquires a device descriptor that describes the configuration as a USB device from the USB device controller 22 of the printer 20. The printer replies to a request to acquire the device descriptor from the USB host controller 17 with a printer class in a case of operating as a single-function printer, but in a case of operating as a multi-function printer, replies with the printer class as well as with a vendor-specific class indicative of the fact that usage as a scanner is also possible. This makes it possible for the computer 10 to recognize that the printer 20 is a single-function printer when the acquired device descriptor includes only the printer class as the device class, and to recognize that the printer 20 is a multi-function printer when the acquired device descriptor includes the printer class and the vendor-specific class as the device class. When the communication connection is established and communication with the printer 20 becomes possible, then the computer 10 becomes able either to transmit a print command (print job) to the printer 20 and cause an image to be printed, or, in a case where the printer 20 is operating as a multi-function printer, to cause a variety of functions to be executed.

Figure 3:
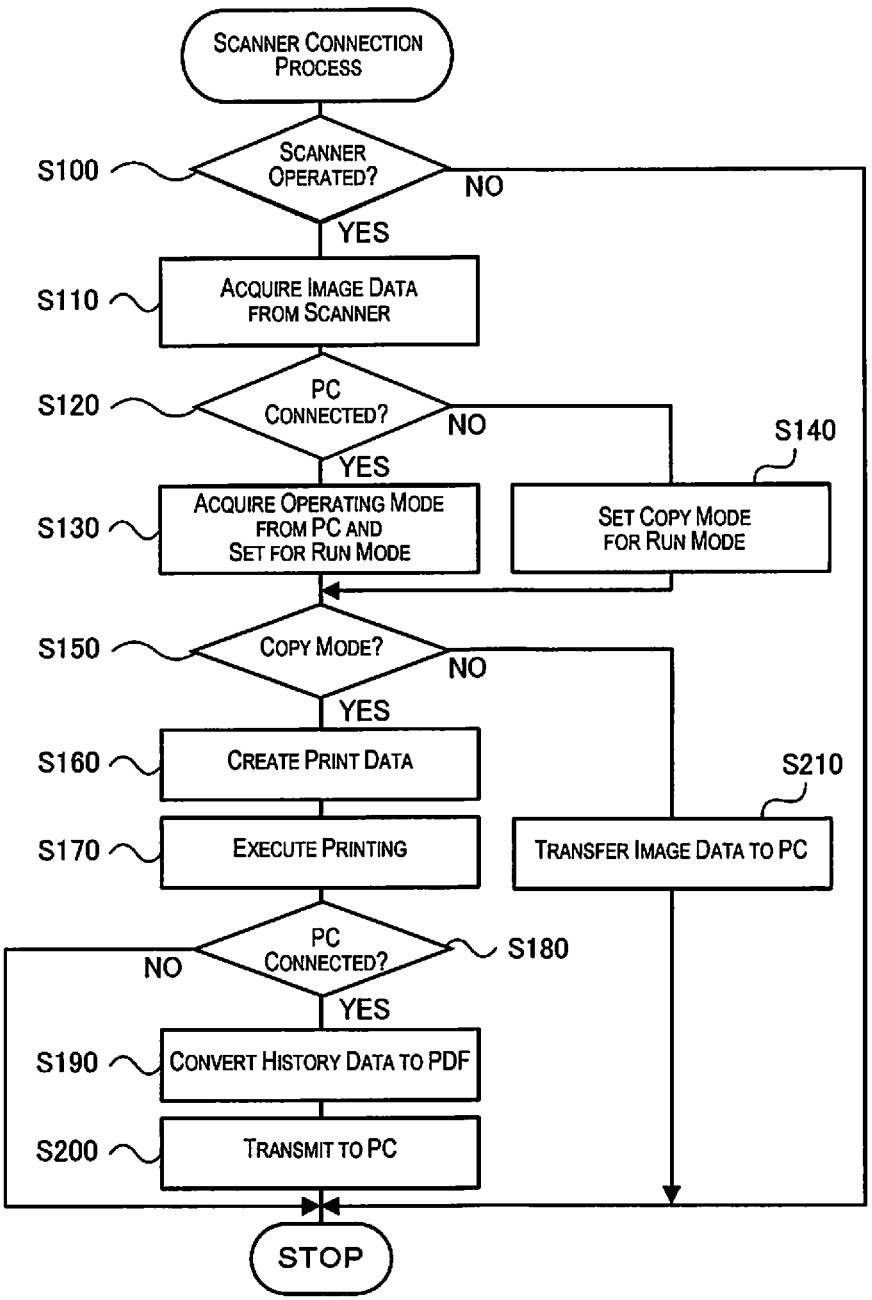
FIG. 3 is a flow chart illustrating one example of a scanner connection process.

The operation of the printer 20 of the present embodiment thus configured shall be described next. FIG. 3 is a flow chart illustrating one example of a scanner connection process that is executed by the CPU 31 of the main controller 30. This process is executed when the communication connection with the scanner 50 is being established.

When the scanner connection process is executed, the CPU 31 of the main controller 30 first determines whether or not the start button 67 has been operated on the scanner 50 (step S100). This process could be carried out by receiving, via the USB host controller 24, an operation signal of the start button 67 from the USB device controller 52 of the scanner 50. When the start button 67 is operated in a state where a document has been inserted into the insertion port 51, then the scanner 50 reads the document and generates the image data.

Figure 4:
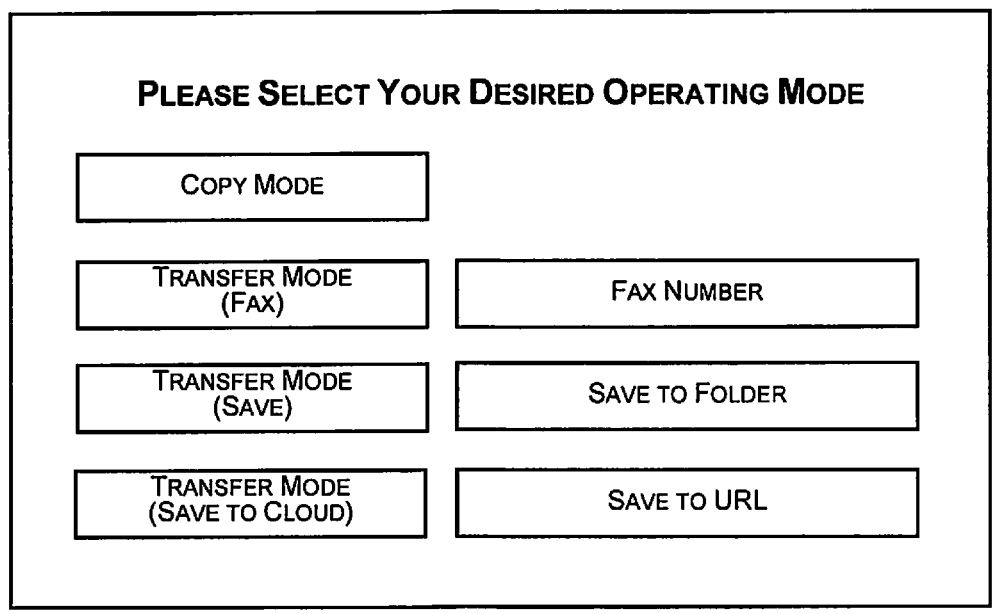
FIG. 4 is a descriptive view illustrating one example of a mode selection screen.

Next, the image data generated by the scanner 50 is acquired via the USB host controller 24 from the USB device controller 22 of the scanner 50 (step S110). A determination is then made as to whether or not the communication connection has been established with the computer 10 (step S120); when the communication connection is determined to have been established, then the current operating mode is acquired from the computer 10, and the acquired operating mode is set as a run mode (step S130). Herein, the operating mode is for determining the process to be executed by the printer 20 with respect to the image data that is received from the scanner 50, and, in the present embodiment, encompasses a copy mode for executing a print process based on the image data acquired from the scanner 50 as well as a transfer mode for transferring the image data acquired from the scanner 50 to the computer 10. The acquisition of the operating mode could be carried out by, for example, on the computer 10 side, display a mode selection screen for selecting the operating mode on the display 19 and accepting a selection from the user, where the selected operating mode is to be transmitted from the USB host controller 17, and, on the printer 20 side, by receiving the selected mode via the USB device controller 22. FIG. 4 illustrates one example of a mode selection screen. As depicted, the mode selection screen displays a message such as "Please select your desired operating mode", and selection buttons for "Copy mode", "Transfer mode (FAX)", "Transfer mode (save)", and "Transfer mode (save to cloud)". Herein, the "Transfer mode (FAX)", "Transfer mode (save)", and "Transfer mode (save to cloud)" are all modes where the printer 20 transfers the image data generated at the scanner 50 to the computer 10, but differ respectively in the operation of the computer 10 that has received the image data. Namely, the "Transfer mode (FAX)" is a mode for transmitting the received image data to a designated FAX number, and an input area for inputting the FAX number is provided to the right side thereof. The "Transfer mode (save)" is a mode for saving the received image data to a designated folder, and an input area for designating the folder is provided to the right side thereof. The "Transfer mode (save to cloud)" is a transfer mode for uploading the received image data to a cloud storage of a designated URL, and an input area for designating the URL is provided to the right side thereof. The copy mode is set as the run mode (step S140) when the communication connection with the computer 10 is determined not to have been established in step S120.

When the run mode is thus set, a determination is made as to whether or not the set run mode is the copy mode (step S150). When the run mode is determined to be the copy mode, then print data is created based on the image data acquired in step S110 (step S160), and the print process is executed based on the created print data (step S170). A determination is then made as to whether or not the communication connection with the computer 10 has been established (step S180); when the communication connection is determined to have been established, then history data is converted to the portable document format (PDF) (step S190), the converted history data is transmitted to the computer 10 (USB host controller 17) via the USB device controller 22 (step S200), and the scanner connection process is concluded. Examples of the history data could include the scan date and time, the sender, thumbnail data (a thumbnail image), or the like. Having received the history data, the computer 10 is able to save the history data to a built-in memory, or to upload the history data to a cloud storage.

When the set run mode is determined not to be the copy mode in step S150, then the set run mode is a transfer mode, and therefore the image data acquired in step S110 is transferred to the computer 10 (USB host controller 17) via the USB device controller 22 (step S210), and the scanner connection process is concluded. Having received the image data, the computer 10 would then execute a process in accordance with the user selection out of the "Transfer mode (FAX)", the "Transfer mode (save)", and the "Transfer mode (save to cloud)", as described above.

Herein, the relationships of correspondence between the constituent elements of the present embodiment and the constituent elements of the present invention shall be made readily apparent. In the present embodiment, the scanner 50, the start button 67, the USB host controller 24, the CPU 31 of the main controller 30 for executing the processes of the steps S120 to S140 in the scanner connection process in FIG. 3, and the CPU 31 of the main controller 30 for executing the processes of the steps S130 to S210 in the scanner connection process correspond to the "image read apparatus", the "operation unit", the "image read apparatus-side communicating section or means", the "run mode acquiring section or means", and the "process executing section or means", respectively. The USB device controller 22 and the CPU 31 of the main controller 30 for executing the process of step S130 in the scanner connection process correspond to the "host machine-side communicating section or means" and the "setting information acquiring section or means", respectively.

According to the printer 20 of the present embodiment as described above, a plurality of functions of the printer 20 can be realized in response to the single start button 67 of the scanner 50, because the image data generated by the scanner 50 by reading the document is acquired when the start button 67 of the scanner 50 is operated in a state where the communication connection with the scanner 50 has been established, and a process corresponding to the current operating mode (copy mode or transfer mode) is then executed on the acquired image data. As a result, the convenience for the user can be improved.

Further, according to the printer 20 of the present embodiment, a variety of modes selected by the user can be acquired even with a simple configuration for the operational system of the printer 20, such as a portable printer, because the run mode is acquired from the computer 10 in a state where the printer 20 is connected to the computer 10.

The present invention is in no way limited to the embodiment described above, and it shall be readily understood that the present invention can be implemented in a variety of modes provided that the implementation falls within the technical scope of the present invention.

For example, the embodiment described above is provided with the copy mode and the transfer modes as the operating mode, but there is no limitation thereto, and any operating mode may be provided so long as a plurality of operating modes including the copy mode are provided, such as being provided with, for example, a save mode for saving the image data acquired from the scanner 50 to a built-in memory, a memory card that can be removed from the printer 20, or the like.

The embodiment described above is such that the operating mode selected by the user out of the plurality of operating modes is acquired from the computer 10, but there is no limitation thereto, and the selection of the operating mode by the user may be received by using an operation panel provided to the printer 20.

The embodiment described above is such that the history data is converted to a PDF and transmitted to the computer 10 in a case where the print process is executed based on the image data generated in the scanner 50, but there is no limitation thereto, and the history data may be converted to another format other than PDF and then transmitted. The history data also need not be transmitted.

The embodiment described above is such that a FAX process, save process, and save-to-cloud process are provided as the processes carried out by the computer 10 in the transfer modes, but there is no limitation thereto, and some of these may be omitted, or other processes may be executed.

The embodiment described above is such that the printer 20 is applied to a portable printer, but there is no limitation thereto, and the configuration may be for application to a stationary printer. The scanner 50, too, is not limited to being applied to a portable scanner, and may be applied to a stationary scanner.

The embodiment described above is such that USB is used as a communication standard for communicating with the computer 10 (a host machine) and the scanner 50 (a device machine), but there is no limitation thereto, and any communication standard may be used.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. A print apparatus configured to connect with and disconnect a connection with an image read apparatus that is configured to read an image based on an operation of an operation unit, the print apparatus comprising:
   an image read apparatus-side communicating section configured to communicate with the image read apparatus in a state where the image read apparatus is connected;
   a run mode acquiring section configured to acquire one of a plurality of run modes of the print apparatus including a copy mode;
   a process executing section configured to execute a process corresponding to the run mode,
   the process executing section being further configured to execute a copy process for generating print data based on image data and executing printing based on the generated print data in a case where the image data that is read by the image read apparatus based on the operation of the operation unit in a state where the copy mode has been acquired as the run mode is received via the image read apparatus-side communicating section, and
   the process executing section being further configured to execute a process corresponding to the run mode based on the image data in a case where the image data that is read by the image read apparatus based on the operation of the operation unit in a state where a mode other than the copy mode has been acquired as the run mode is received via the image read apparatus-side communicating section, so that the plurality of run modes of the print apparatus are executed in response to a single operation of the operation unit of the image read apparatus; and
   a host machine-side communicating section configured to communicate with a host machine,
   the run mode acquiring section being further configured to acquire one of the plurality of run modes including the copy mode and a transfer mode, and
   the process executing section being further configured to execute a transfer process for transferring the image data to the host machine via the host machine-side communicating section in a case where the image data that is read by the image read apparatus based on the operation of the operation unit in a state where the transfer mode has been acquired as the run mode is received via the image read apparatus-side communicating section;
   a determination is made as to whether or not communication connection has been established with the host machine,
   when the communication connection with the host machine is determined to have been established, a current operating mode is acquired from the host machine and the acquired operating mode is set as the run mode of the print apparatus, and
   when the communication connection with the host machine is determined not to have been established, the copy mode is set as the run mode of the print apparatus.

2. The print apparatus according to claim 1, wherein the transfer mode includes a mode for transferring the image data to the host machine and instructing that the image data be saved to a storage device provided to the host machine.

3. The print apparatus according to claim 1, wherein the transfer mode includes a mode for transferring the image data to the host machine and instructing that the image data be saved to a storage device connected to the host machine via a network.

4. The print apparatus according to claim 3, further comprising a host machine-side communicating section configured to communicate with a host machine, and
   a setting information acquiring section configured to acquire setting information via the host machine-side communicating section from the host machine,
   the run mode acquiring section being further configured to acquire one of the plurality of run modes based on the acquired setting information.

* * * * *